(12) United States Patent
Zhou et al.

(10) Patent No.: US 11,093,276 B2
(45) Date of Patent: Aug. 17, 2021

(54) SYSTEM AND METHOD FOR BATCH ACCESSING

(71) Applicant: ALIBABA GROUP HOLDING LIMITED, Grand Cayman (KY)

(72) Inventors: Qinggang Zhou, San Mateo, CA (US); Lingling Jin, San Mateo, CA (US)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 170 days.

(21) Appl. No.: 16/247,519

(22) Filed: Jan. 14, 2019

(65) Prior Publication Data

US 2019/0227838 A1 Jul. 25, 2019

Related U.S. Application Data

(60) Provisional application No. 62/621,417, filed on Jan. 24, 2018.

(51) Int. Cl.
 *G06F 9/46* (2006.01)
 *G06F 9/54* (2006.01)
 *G06F 3/06* (2006.01)

(52) U.S. Cl.
 CPC ............ *G06F 9/467* (2013.01); *G06F 3/0656* (2013.01); *G06F 9/544* (2013.01)

(58) Field of Classification Search
 CPC ..................................................... G06F 9/467
 See application file for complete search history.

(56) References Cited

U.S. PATENT DOCUMENTS

| | | | | |
|---|---|---|---|---|
| 8,073,990 | B1* | 12/2011 | Baron | G06F 13/28 710/22 |
| 2016/0055001 | A1* | 2/2016 | Levinsky | G06F 9/3802 712/205 |
| 2017/0083337 | A1* | 3/2017 | Burger | G06F 9/3848 |

OTHER PUBLICATIONS

Gwennap, Linley "Wave Accelerates Deep Learning", Microprocessor Report, The Linley Group, Oct. 3, 2016 (4 pages).
Nvidia Tesla P100 Whitepaper "The Most Advanced Datacenter Acdelerator Ever Built", https://images.nvidia.com/content/pdf/tesla/whitepaper/pascal-architecture-whitepaper.pdf; WP-08019-001_v01.1, 2015 Nvidia Corporation (45 pages).
Jouppi et al. "In-Datacenter Performance Analysis of a Tensor Processing Unit", https://arxiv.org/ftp/arxiv/papers/1704/1704.04760.pdf, ICSA, Jun. 2017 (17 pages).

* cited by examiner

*Primary Examiner* — Jacob D Dascomb
(74) *Attorney, Agent, or Firm* — Finnegan, Henderson, Farabow, Garrett & Dunner, LLP (57) ABSTRACT

Embodiments of the present disclosure provides systems and methods for batch accessing. The system includes a plurality of buffers configured to store data; a plurality of processor cores that each have a corresponding buffer of the plurality of buffers; a buffer controller configured to generate instructions for performing a plurality of buffer transactions on at least some buffers of the plurality of buffers; and a plurality of data managers communicatively coupled to the buffer controller, each data manager is coupled to a corresponding buffer of the plurality of buffers and configured to execute a request for a buffer transaction at the corresponding buffer according to an instruction received from the buffer controller.

16 Claims, 8 Drawing Sheets

SYSTEM AND METHOD FOR BATCH ACCESSING

CROSS REFERENCE TO RELATED APPLICATION

The disclosure claims the benefits of priority to U.S. Provisional Application No. 62/621,417, filed Jan. 24, 2018, which is incorporated herein by reference in its entirety.

BACKGROUND

Recent growth of deep learning applications can require more and more computational capacities. The performance requirement of the deep learning algorithms challenge the limits of existed computing devices, such as central processing units (CPUs), graphic processing units (GPUs), and coarse grain reconfigurable architecture (CGRA) devices. The performance of batch accessing (e.g., reading or writing) is limited by the conventional structure of the buffers of the existed computing devices. For example, a long latency can be generated during batch accessing due to the conventional structure of the buffers, and the design of the buffers can be complex. Such shortcomings can deteriorate the performance of on-chip systems incorporating these existed computing devices.

SUMMARY OF THE DISCLOSURE

Embodiments of the disclosure provide a system for batch accessing. The system includes a plurality of buffers configured to store data; a plurality of processor cores that each have a corresponding buffer of the plurality of buffers; a buffer controller configured to generate instructions for performing a plurality of buffer transactions on at least some buffers of the plurality of buffers; and a plurality of data managers communicatively coupled to the buffer controller, each data manager is coupled to a corresponding buffer of the plurality of buffers and configured to execute a request for a buffer transaction at the corresponding buffer according to an instruction received from the buffer controller.

Embodiments of the disclosure provide a method for batch accessing a plurality of buffers associated with a processor core array. The method includes: generating, at a buffer controller, an instruction for performing a plurality of buffer transactions on at least some buffers of the plurality of buffers; acquiring, at a data manager associated with a corresponding buffer of the plurality of buffers, the instruction from the buffer controller; and executing, at the data manager, a request for a buffer transaction at the corresponding buffer according to the instruction.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Particular aspects of the present disclosure are described in greater detail below. The terms and definitions provided herein control, if in conflict with terms and/or definitions incorporated by reference.

The techniques described in this disclosure have one or more of the following technical effects. In some implementations, the techniques described in this disclosure provide a data manager (DM) between each processor core and its corresponding buffer, and a buffer controller coupled with all data managers and the upper level of a computer system. This frees the processor cores of the computer system from the batch accessing. Thus, the techniques can provide a low-latency and low-cost solution for batch data transfer over an array of CGRA nodes. In some implementations, the techniques can also change a ratio between the number of the processor cores and the number of the buffers. Thus, the techniques can provide a scalable design to the batch data transfer in addition to the cost of the design being linear.

Figure 1:
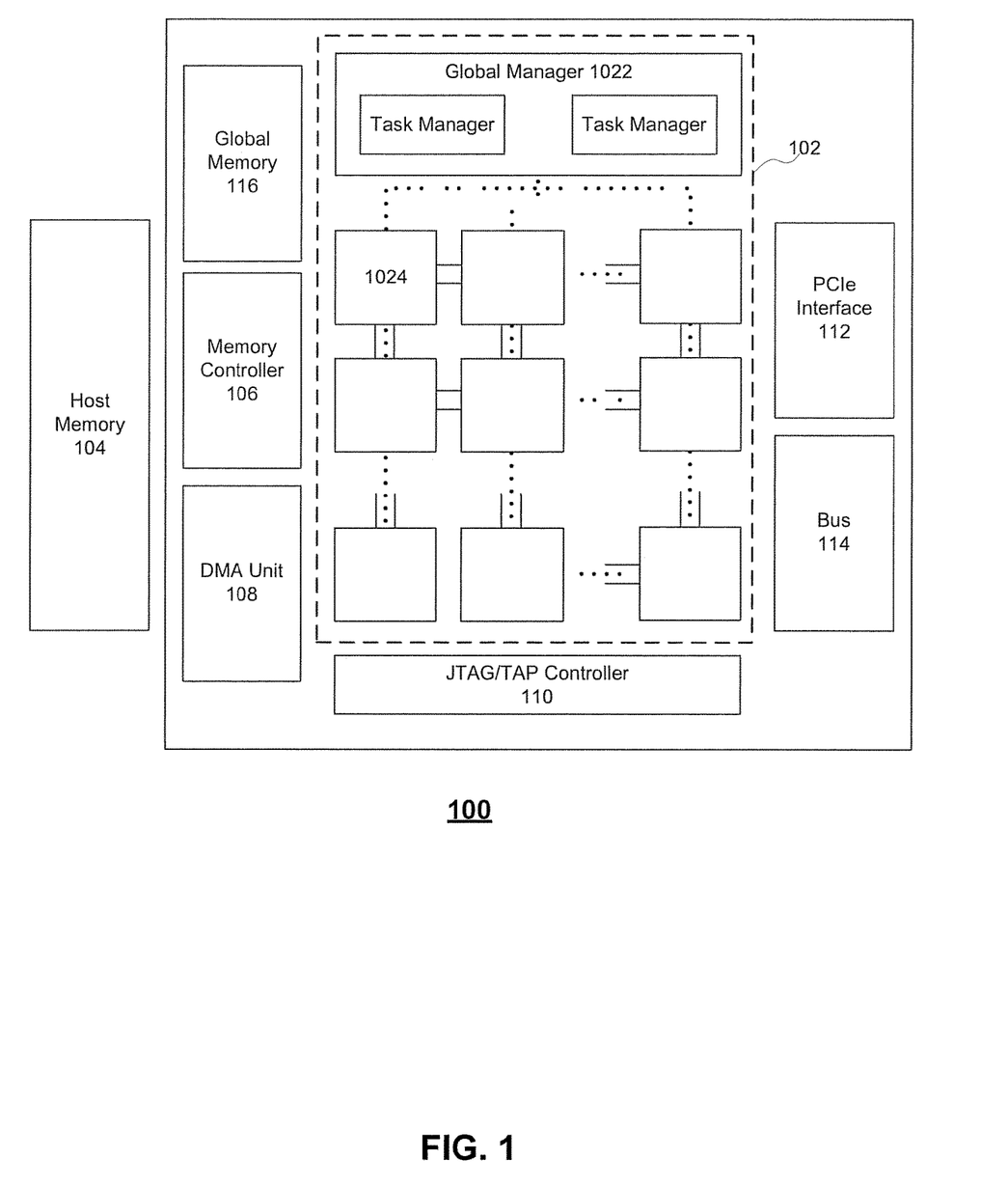
FIG. 1 illustrates an exemplary neural network processing unit (NPU) architecture, according to embodiments of the disclosure.

FIG. 1 illustrates exemplary neural network processing unit (NPU) architecture 100, according to embodiments of the disclosure. As shown in FIG. 1, NPU architecture 100 can include a chip communication system 102, an host memory 104, a memory controller 106, a direct memory access (DMA) unit 108, a Joint Test Action Group (JTAG)/Test Access End (TAP) controller 110, a peripheral interface 112, a bus 114, a global memory 116, and the like. It is appreciated that, chip communication system 102 can perform algorithmic operations based on communicated data.

Chip communication system 102 can include a global manager 1022 and a plurality of cores 1024. Global manager 1022 can include at least one task manager to coordinate with one or more cores 1024. Each task manager can be associated with an array of cores 1024 that provide synapse/neuron circuitry for the neural network. For example, the top layer of processing elements of FIG. 1 may provide circuitry representing an input layer to neural network, while the second layer of tiles may provide circuitry representing a hidden layer of the neural network. As shown in FIG. 1, global manager 1022 can include two task managers to coordinate with two arrays of cores.

Cores 1024 can include one or more processing elements that each include single instruction, multiple data (SIMD) architecture including one or more processing units configured to perform one or more operations (e.g., multiplication, addition, multiply-accumulate, etc.) based on instructions received from global manager 1022. To perform the operation on the communicated data packets, cores 1024 can include one or more processing elements for processing information in the data packets. Each processing element may comprise any number of processing units. In some embodiments, core 1024 can be considered a tile or the like.

Host memory 104 can be off-chip memory such as a host CPU's memory. For example, host memory 104 can be a DDR memory (e.g., DDR SDRAM) or the like. Host memory 104 can be configured to store a large amount of data with slower access speed, compared to the on-chip memory integrated within one or more processors, acting as a higher-level cache.

Memory controller 106 can manage the reading and writing of data to and from a specific memory block within global memory 116 having on-chip memory blocks (e.g., 4 blocks of 8 GB second generation of high bandwidth memory (HBM2)) to serve as main memory. For example, memory controller 106 can manage read/write data coming from outside chip communication system 102 (e.g., from DMA unit 108 or a DMA unit corresponding with another NPU) or from inside chip communication system 102 (e.g., from a local memory in core 1024 via a 2D mesh controlled by a task manager of global manager 1022). Moreover, while one memory controller is shown in FIG. 1, it is appreciated that more than one memory controller can be provided in NPU architecture 100. For example, there can be one memory controller for each memory block (e.g., HBM2) within global memory 116.

Memory controller 106 can generate memory addresses and initiate memory read or write cycles. Memory controller 106 can contain several hardware registers that can be written and read by the one or more processors. The registers can include a memory address register, a byte-count register, one or more control registers, and other types of registers. These registers can specify some combination of the source, the destination, the direction of the transfer (reading from the input/output (I/O) device or writing to the I/O device), the size of the transfer unit, the number of bytes to transfer in one burst, and/or other typical features of memory controllers.

DMA unit 108 can assist with transferring data between host memory 104 and global memory 116. In addition, DMA unit 108 can assist with transferring data between multiple NPUs (e.g., NPU 100). DMA unit 108 can allow off-chip devices to access both on-chip and off-chip memory without causing a CPU interrupt. Thus, DMA unit 108 can also generate memory addresses and initiate memory read or write cycles. DMA unit 108 also can contain several hardware registers that can be written and read by the one or more processors, including a memory address register, a byte-count register, one or more control registers, and other types of registers. These registers can specify some combination of the source, the destination, the direction of the transfer (reading from the input/output (I/O) device or writing to the I/O device), the size of the transfer unit, and/or the number of bytes to transfer in one burst. It is appreciated that NPU architecture 100 can include a second DMA unit, which can be used to transfer data between other NPU architecture to allow multiple NPU architectures to communication directly without involving the host CPU.

JTAG/TAP controller 110 can specify a dedicated debug port implementing a serial communications interface (e.g., a JTAG interface) for low-overhead access to the NPU without requiring direct external access to the system address and data buses. JTAG/TAP controller 110 can also have on-chip test access interface (e.g., a TAP interface) that implements a protocol to access a set of test registers that present chip logic levels and device capabilities of various parts.

Peripheral interface 112 (such as a PCIe interface), if present, serves as an (and typically the) inter-chip bus, providing communication between the NPU and other devices.

Bus 114 includes both intra-chip bus and inter-chip buses. The intra-chip bus connects all internal components to one another as called for by the system architecture. While not all components are connected to every other component, all components do have some connection to other components they need to communicate with. The inter-chip bus connects the NPU with other devices, such as the off-chip memory or peripherals. Typically, if there is a peripheral interface 112 (e.g., the inter-chip bus), bus 114 is solely concerned with intra-chip buses, though in some implementations it could still be concerned with specialized inter-bus communications.

In chip communication system 102, the arithmetic calculation can be performed by the cores. The cores and buffers can be organized by a plurality of architectures, such as the CGRA.

Figure 2:
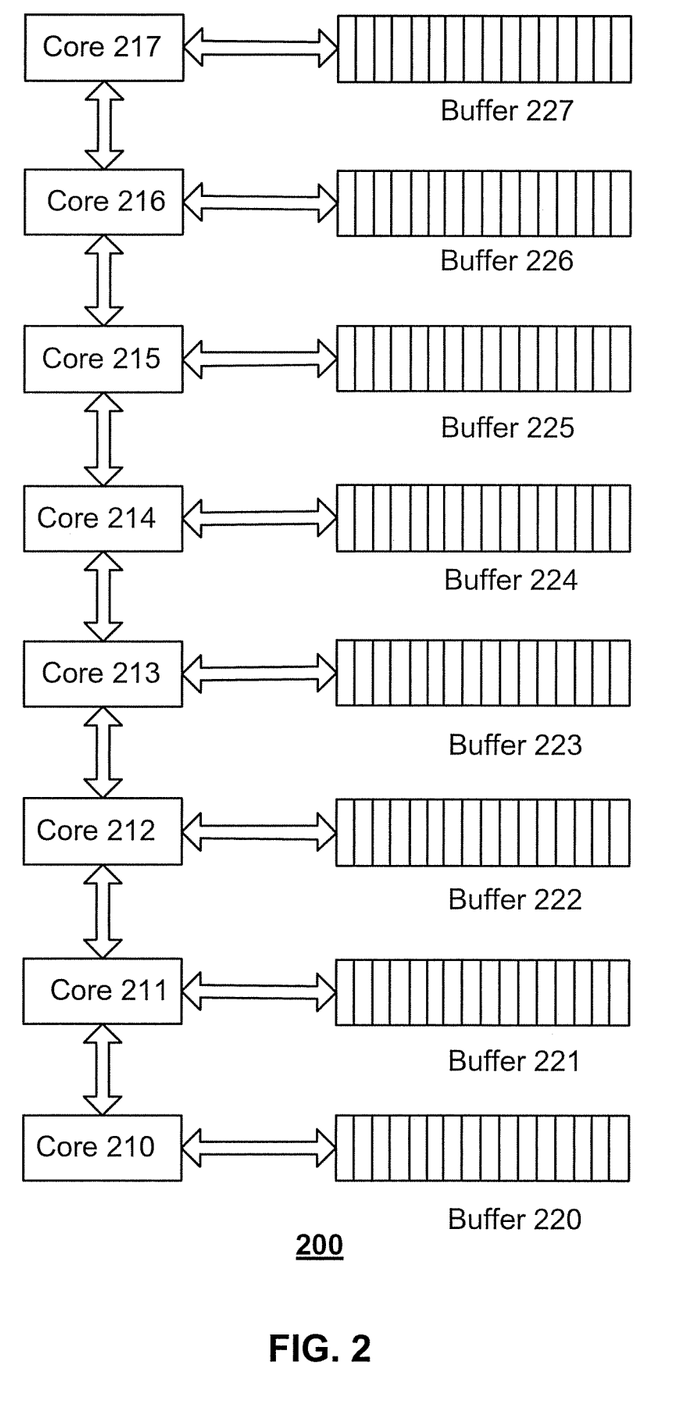
FIG. 2 illustrates a schematic diagram of an exemplary CGRA of cores and buffers.

FIG. 2 illustrates a schematic diagram of an exemplary conventional CGRA 200 of cores and buffers. CGRA 200 can include cores 210-217 and buffers 220-227. Each of cores 210-217 can be connected to its own memory buffer (e.g., buffers 220-227). Each of cores 210-217 can also be connected to its neighboring core. Data packets can be read from the buffer and passed onto each core via the connections between adjacent cores. If the destination of the data packets is several cores away from the original core (e.g., core 210), the data packets are passed to the destination via a chain of the neighboring connections, thereby causing a long latency. Furthermore, if the data packets are being broadcasted to a plurality of cores by the original core (e.g., core 210), a route for broadcasting the data packets can involve a large number of cores to coordinate such a broadcast. With more cores being involved, the processing performed by these cores is increased and the latency is further increased. Therefore, the exemplary conventional architecture as shown in FIG. 2 can be less efficient for deep learning, as deep learning can require high-intensive communication among cores.

Figure 3:
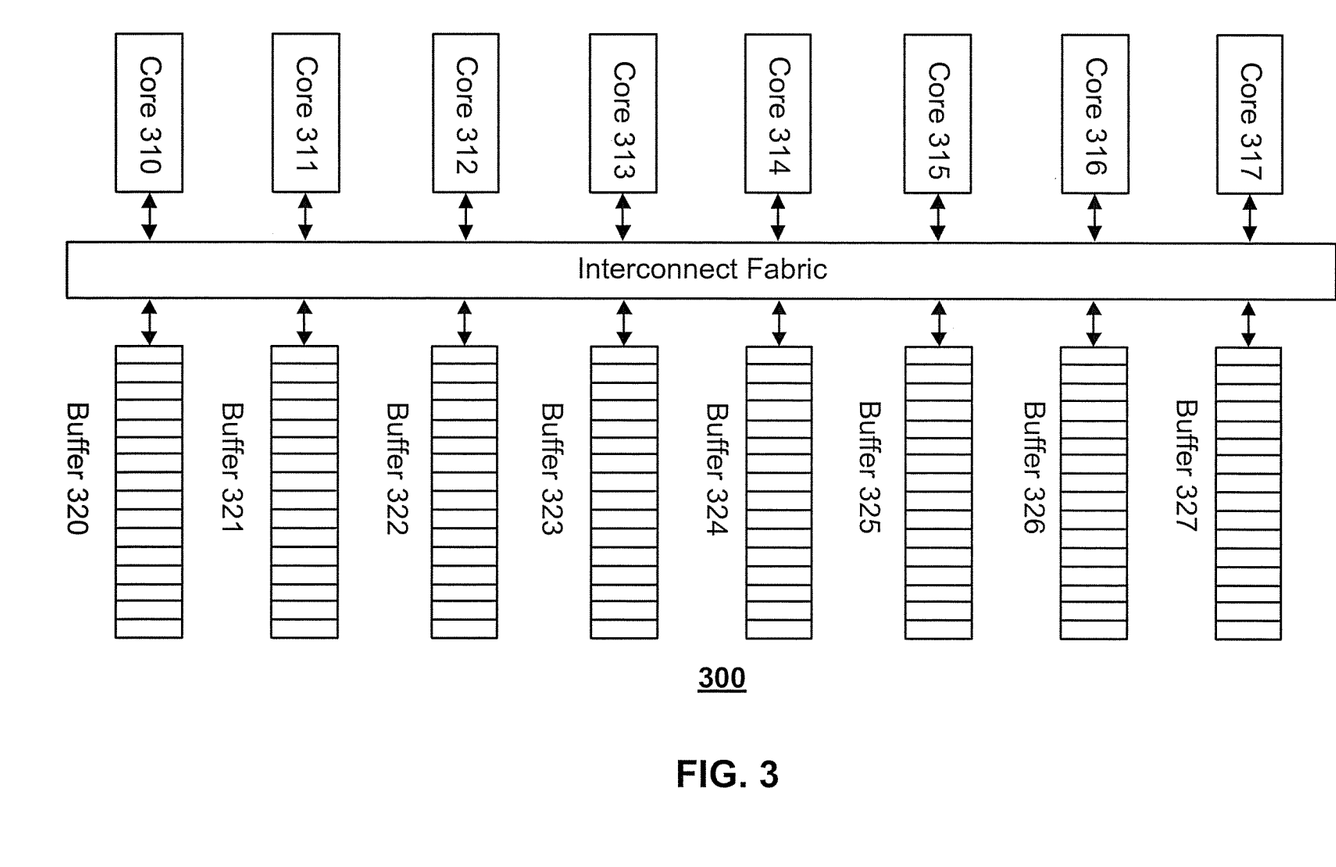
FIG. 3 illustrates a schematic diagram of another exemplary CGRA of cores and buffers.

FIG. 3 illustrates a schematic diagram of another exemplary conventional CGRA 300 of cores and buffers. CGRA 300 can integrate an interconnect fabric for passing data packets among cores 310-317 and buffers 320-327. While this design makes it easier to transfer data to a far-away core, the computational cost of using this interconnect fabric is proportional to $O(n^2)$. Thus, when a larger array size of cores is involved (which is common in deep learning applications), the computational cost becomes too high. Moreover, the pattern for data communication among cores and buffers for deep learning can be predictable, such a complicated interconnect fabric may not be worth pursuing.

Figure 4:
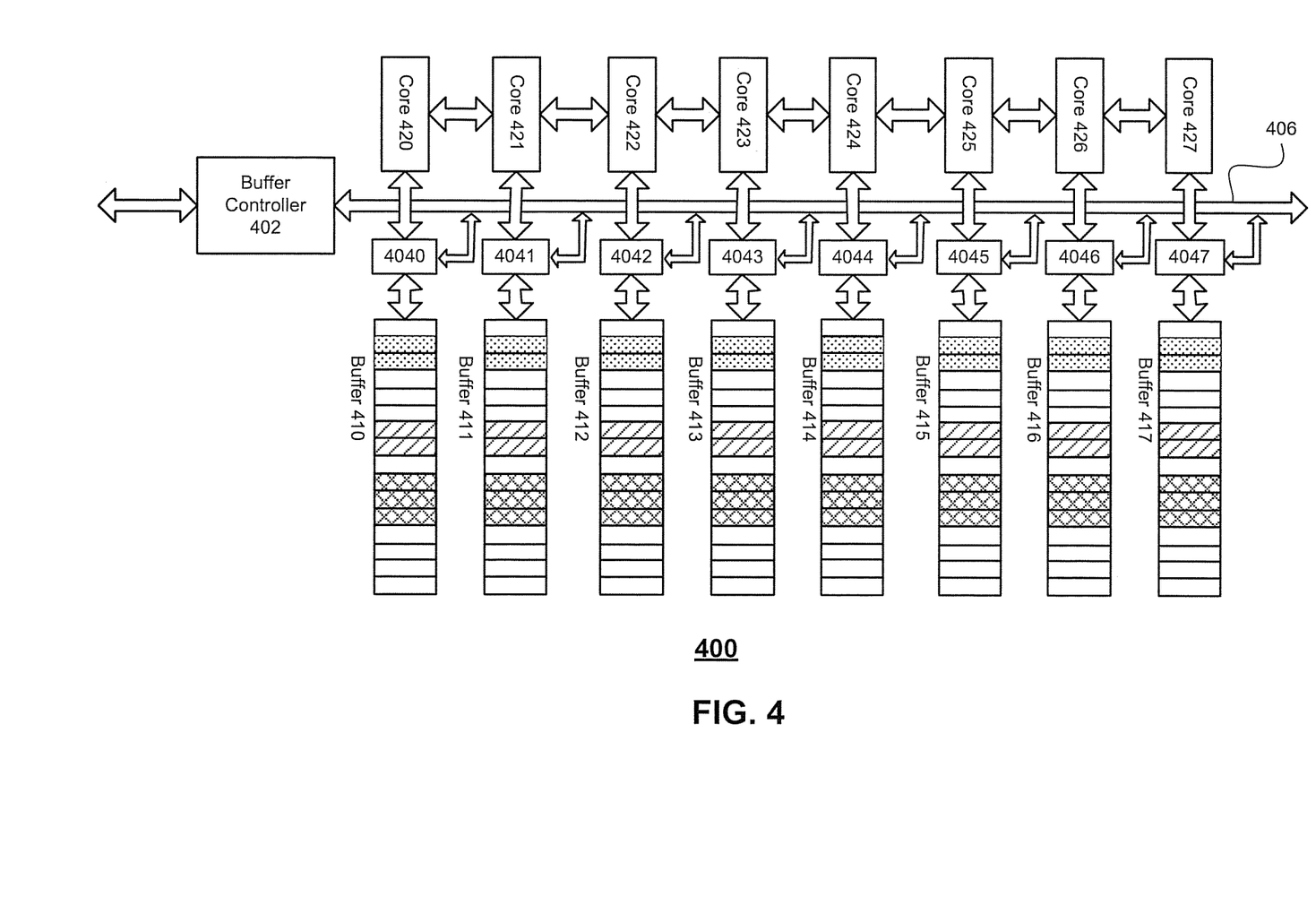
FIG. 4 illustrates a schematic diagram of an exemplary system for batch accessing, according to embodiments of the disclosure.

FIG. 4 illustrates a schematic diagram of an exemplary system 400 for batch accessing, according to embodiments of the disclosure. System 400 can be a part of on-chip system 100.

System 400 can include a buffer controller 402, a plurality of data managers 4040-4047, an interconnect fabric 406, an array of buffers 410-417, and an array of processor cores 420-427. Each of buffers 410-417 can include a plurality of data units to store data. As shown in FIG. 4, each of processor cores 420-427 has a corresponding buffer. In some embodiments, a processor core can have more than one corresponding buffer, or more than one core can share one corresponding buffer. Thus, a ratio between the number of processor cores and the number of buffers can be scalable depending on the design requirement of the system. It is appreciated that the numbers of data managers, buffers, and processor cores are merely exemplary in FIG. 4.

Buffer controller 402 can generate instructions for performing a plurality of buffer transactions on at least some of buffers 410-417. For example, on-chip system 100 can receive a computation task (e.g., deep learning), and buffer controller 402 can generate instructions based on the received task. These instructions can be assigned to data managers corresponding to the at least some of buffers 410-417 for execution.

The plurality of data managers 4040-4047 can be communicatively coupled to buffer controller 402, and execute a request for a buffer transaction at the corresponding buffer according to an instruction received from buffer controller 402. The buffer transaction can include read and write. In some embodiments, by coordinating several data managers, the buffer transaction can further include broadcasting. For example, under the instruction from buffer controller 402, data manager 4040 can read a data packet from buffer 410 and forward the data packet to buffers 411 and 412 in the array of buffers, so that the data packets can be broadcasted. Interconnect fabric 406 can be configured to couple buffer controller 402 and the plurality of data managers 4040-4047 and can pass the data packets. It is appreciated that the broadcasting can be performed to all cores (e.g., 420-427) or a selection of the cores (e.g., 420-426), according to the instruction.

The instruction received from buffer controller 402 can be associated with patterns of the data packets and include one or more parameters associated with the patterns for deep learning. In some embodiments, the parameters can include "starting_address," "width," "rlen," "tlen," "stride," or the like. And these parameters can be applied to both reading data from the buffers or writing data to the buffers.

In some embodiments, the parameter "starting_address" can indicate the starting location of a buffer transaction. As shown in FIG. 4, system 400 includes buffers 410-417 and each buffer can further include a plurality of data units indicated by blocks in the buffer. As data can be read or written across these buffers and data units within each buffer, a starting address can be defined to locate a buffer and a data unit of the buffer to start the buffer transaction. Therefore, the parameter "starting_address" can include an identification of the buffer and an offset in that buffer. The identification can be used to locate the buffer, and the offset can be used to indicate a position of a data unit where the buffer transaction starts. This data unit where the buffer transaction starts can be referred to as an initial data unit. Each data unit can store a predetermined size of data. In embodiments of this disclosure, the size of a data unit can be four words (or 16 bytes). The size of a data unit can be indicated by the parameter "width" of the instruction.

The parameter "rlen" can indicate a number of data units accessed in one buffer transaction. The parameter "tlen" can indicate a total number of buffer transactions to be performed. The parameter "stride" can indicate a distance between two transactions in a same buffer. The above parameters can be used in a method for batch accessing, which will be further described below.

Figure 5:
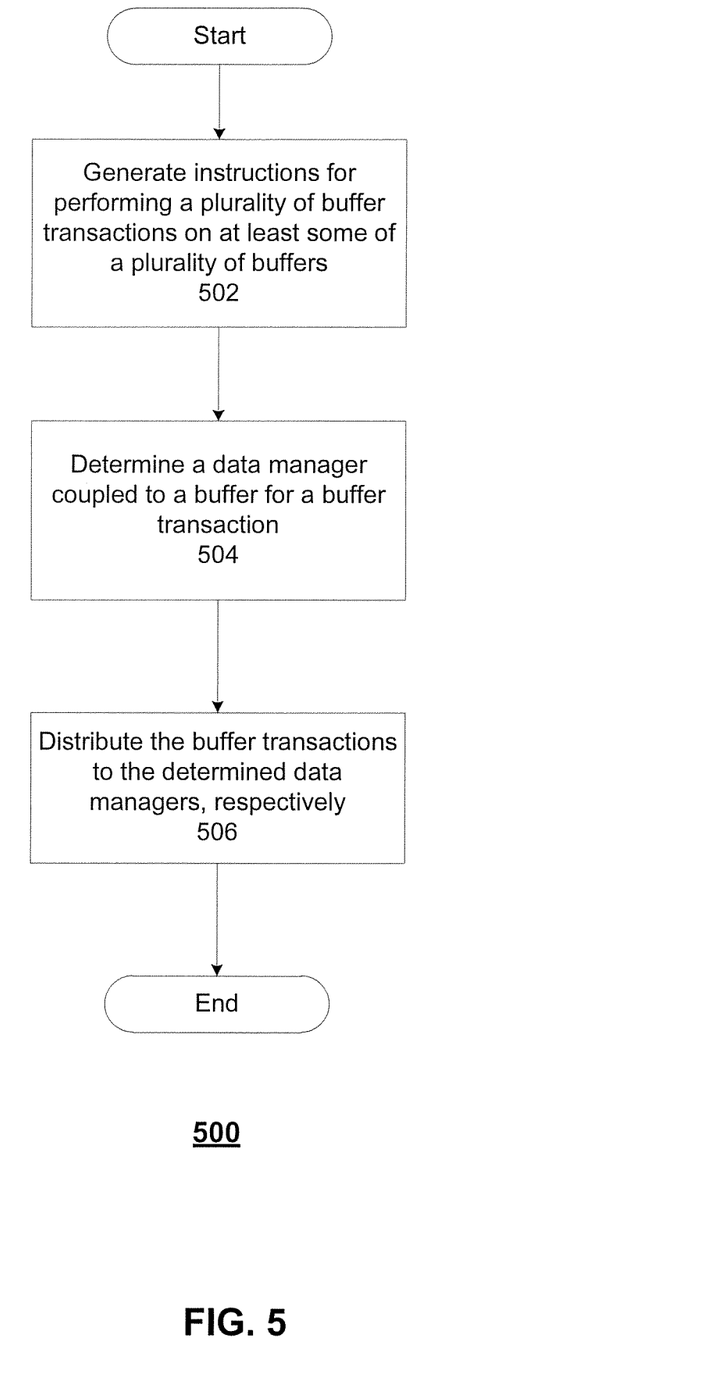
FIG. 5 illustrates a flowchart of an exemplary method for batch accessing a plurality of buffers, according to embodiments of the disclosure.

FIG. 5 illustrates a flowchart of an exemplary method 500 for batch accessing, according to embodiments of the disclosure. Method 500 can include steps 502-506. Method 500 can be performed on a plurality of buffers by a buffer controller (e.g., buffer controller 402 of FIG. 4).

In step 502, an instruction for performing a plurality of buffer transactions on at least some of the plurality of buffers can be generated. It is appreciated that the plurality of buffer transactions also can be generated along with the instruction. Buffer transactions can be reading data from the set of buffers. It is appreciated that a buffer transaction for writing data to the plurality of buffers can be similar. As discussed above, an instruction can be generated based on the received task from on-chip system 100, and the instruction can define each buffer transaction by parameters including "starting_address," "width," "rlen," "tlen," and "stride."

In step 504, a data manager (e.g., data manager 4040) coupled to a buffer (e.g., buffer 410) can be determined for a buffer transaction. In some embodiments, the data manager and the buffer coupled to the data manager can be determined based on parameters of the buffer transaction (e.g., the identification of a buffer). For example, referring to FIG. 4, "starting_address" can indicate the identification of the buffer is 410, and therefore buffer 410 and data manager 4040 associated with buffer 410 can be determined for execution of the buffer transaction. It is appreciated that a data manager can be determined for execution of more than one buffer transactions.

In step 506, the buffer transactions can be distributed to the determined data managers for execution, respectively. Buffer controller 402 can distribute the buffer transactions to respective data managers 4040-4047, so that each data manager can perform the buffer transaction correspondingly. Details of a buffer transaction will be further described with reference to FIG. 6 as below.

Figure 6:
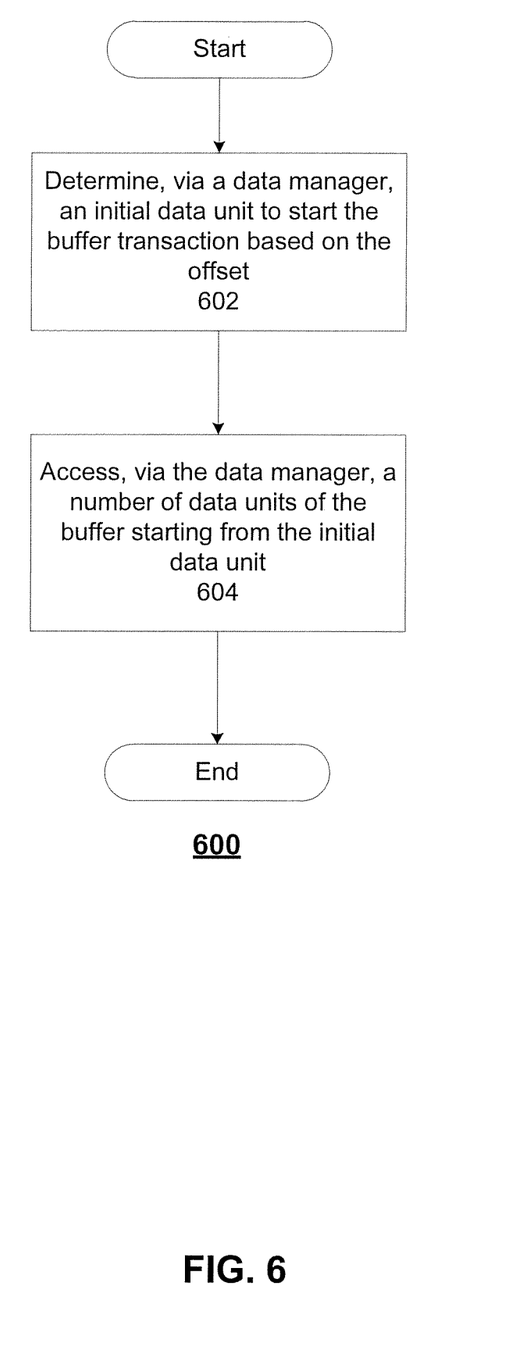
FIG. 6 illustrates a flowchart of an exemplary buffer transaction, according to embodiments of the disclosure.

FIG. 6 illustrates a flowchart of an exemplary buffer transaction 600, according to embodiments of the disclosure. Buffer transaction 600 can be executed by a data manager (e.g., data manager 4040 of FIG. 4) as discussed above. Buffer transaction 600 can include steps 602-606.

Figure 7:
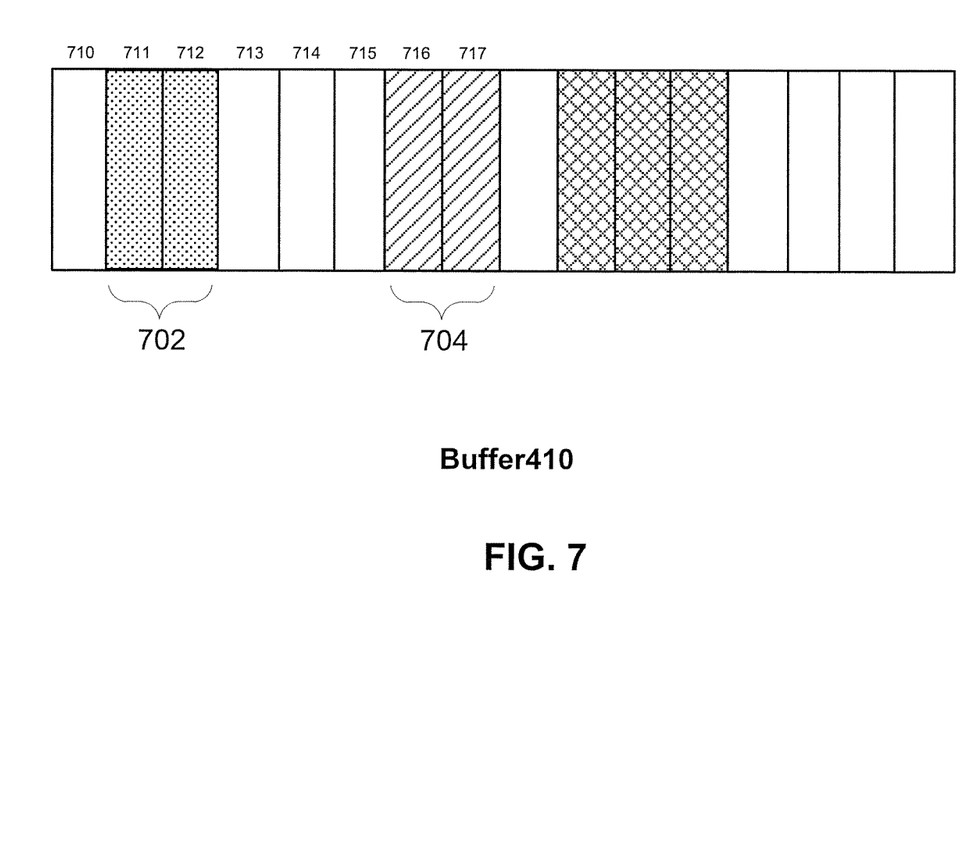
FIG. 7 illustrates a schematic diagram of an exemplary buffer, according to embodiments of the disclosure.

In step 602, an initial data unit can be determined to start buffer transaction 600 based on an offset. As discussed above, "starting_address" can further include information of the offset. For example, "starting_address" can further indicate the offset is "1," a data unit corresponding to the offset "1" can be determined as the initial data unit. FIG. 7 illustrates a schematic diagram of an exemplary buffer 410, according to embodiments of the disclosure.

As shown in FIG. 7, buffer 410 can include a plurality of data units, such as data units 710-717. Among data units 710-717, an offset of data unit 710 can be "0," an offset of data unit 711 can be "1," and offsets of data units 712-717 can be "2-7," respectively. Therefore, in response to the offset being "1," data unit 710 can be determined as the initial data unit, and the buffer transaction can be started from data unit 710.

Referring back to FIG. 6, in step 604, a number of data units of buffer 410 starting from initial data unit 610 can be accessed. For example, "rlen" included in the parameters of buffer transaction 600 can be "2" and indicate that two data units starting from initial data unit 711 to data unit 712 can be accessed. It is appreciated that, in embodiments of this disclosure, "width" of a data unit is 16 bytes. In other words, by accessing data units 711-712, 32 bytes of data can be accessed.

Buffer transaction 600 for one buffer has been described. However, as data can be stored across multiple buffers, a plurality of buffer transactions can be performed on these buffers. Therefore, method 500 can further coordinate buffer transactions across buffers.

Figure 8:
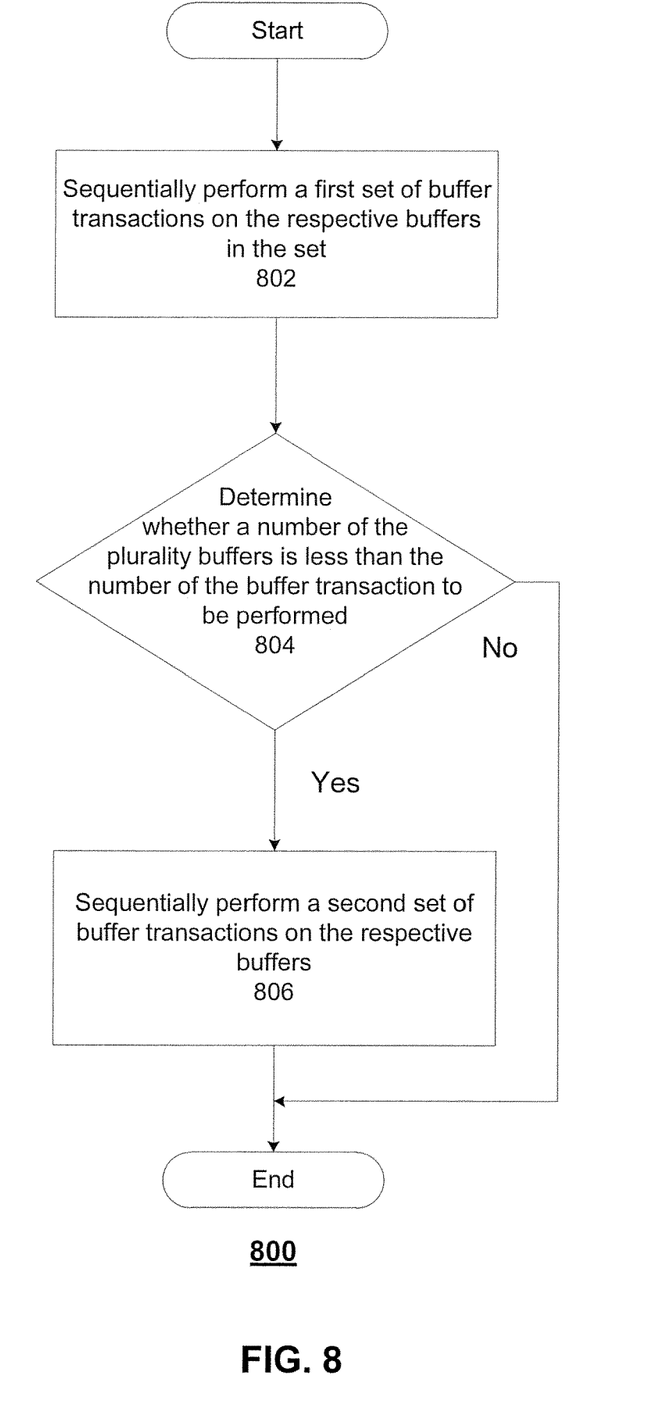
FIG. 8 illustrates a flowchart of an exemplary method for coordinating buffer transactions across buffers, according to embodiments of the disclosure.

FIG. 8 illustrates a flowchart of an exemplary method 800 for coordinating buffer transactions across buffers, according to embodiments of the disclosure. Method 800 can include steps 802-806.

In step 802, a first set of buffer transactions can be sequentially performed on the respective buffers. It is contemplated that the buffer transaction can be applied to each data manager and the buffer corresponding to the data manager. For example, with reference back to FIG. 4, two dotted data units in each buffer (e.g., exemplary buffer 410) can be accessed. When two dotted data units have been accessed, buffer controller 402 can move onto a next buffer (e.g., buffer 411) and read another two dotted data units. In this way, the first set of buffer transactions can be sequentially performed on the respective buffers. In embodiments of FIG. 4, the first set of buffer transactions can include eight transactions, as system 400 includes eight buffers.

In step 804, whether a number of the plurality of buffers (e.g., buffers 410-417) is less than the number of the buffer transaction to be performed can be determined. In some embodiments, "tlen" can be 16. Therefore, it is required to perform buffer transactions 16 times, which is larger than the total number of buffers (e.g., eight buffers). Thus, after buffer controller 402 has performed the first set of buffer transactions (in this case, eight buffer transactions) on all buffers in the array, buffer controller 402 can move back to buffer 410 and perform another set of buffer transactions.

In step 806, in response to the number of buffers (e.g., eight buffers) of system 400 being less than the number of the buffer transactions to be performed (i.e., "tlen"), a second set of buffer transactions can be performed on the buffers of system 400. In some embodiments, data to be accessed is not stored successively in the data units of a buffer. Therefore, the parameter "stride" can indicate a distance between two transactions in a same buffer. In other words, the starting address for the second set can be further offset by "stride." For example, the parameter "stride" can be set to "5." Therefore, the selection of data units in the second set of buffer transactions can be further offset by five data units. With reference back to FIG. 7, a first transaction 702 has accessed data units 711-712, and a second transaction 704 is about to access data units 716-717. Thus, two slashed data units 716 and 717, which are offset from the previously-accessed data units 711 and 712 by five data units, can be accessed in a buffer transaction in the second set.

Because the parameter "tlen" is 16 in this example, after the second set of buffer transactions has been applied to buffer 410-417, the instruction for performing the buffer transaction is completed.

Thus, system 400 can perform batch reading and batch writing to the buffers. The batch-read data can be further transmitted to an upper level of system 400 (e.g., other components in on-chip system 100 of FIG. 1), and the data received from the upper level of system 400 can be batch written to the buffers.

The instruction can also include a broadcast transaction. When the instruction includes the broadcast transaction, the instruction further includes a data width (e.g., parameter "width") of data to be broadcasted.

System 400 can read data from a buffer of the array and then broadcast the read data to buffers in the array. The data width (e.g., parameter "width") equals to a width of the read data in the data unit.

It is contemplated that each data manager can be associated with a predetermined number of buffers. The predetermined number can be greater than one. That is, one data manager can be associated with more than one buffer. And one core can be associated with one or more buffers.

Cores of system 400 are not involved with batching transactions and do not spend resources on the batching transactions. And the implementation cost of embodiments of the disclosure is linear to the number of the buffers and the number of the processor cores. Therefore, embodiments of the disclosure can support a large number of buffers and cores.

The various example embodiments described herein are described in the general context of method steps or processes, which may be implemented in one aspect by a computer program product, embodied in a computer-readable medium, including computer-executable instructions, such as program code, executed by computers in networked environments. For example, it is appreciated that the instructions can be generated by a compiler for managing or controlling the buffer transactions and the accessing of buffers described above. A computer-readable medium can include non-transitory computer-readable storage medium including instructions for applications. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, cloud storage, a FLASH-EPROM or any other flash memory, NVRAM, a cache, a register, any other memory chip or cartridge, and networked versions of the same.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

What is claimed is:

1. A system for batch accessing, comprising:
a plurality of buffers configured to store data;
a plurality of processor cores that each have a corresponding buffer of the plurality of buffers;
a buffer controller configured to:
generate instructions for performing a plurality of buffer transactions on at least some buffers of the plurality of buffers,
sequentially perform a first set of buffer transactions on the respective buffers,
determine whether a number of the plurality of buffers is less than a number of the buffer transactions to be performed, and
sequentially perform a second set of buffer transactions on the respective buffers in response to the number of the plurality of buffers being less than the number of the buffer transactions to be performed; and
a plurality of data managers communicatively coupled to the buffer controller, each data manager is coupled to a corresponding buffer of the plurality of buffers and configured to execute a request for a buffer transaction at the corresponding buffer according to an instruction received from the buffer controller.

2. The system according to claim 1, wherein each buffer includes a plurality of data units, and the instruction received from the buffer controller includes a starting address of the buffer, a number of the buffer transactions to be performed, a number of data units accessed in a buffer transaction.

3. The system according to claim 2, wherein the starting address includes an identification of a buffer, and the buffer controller is further configured to:
  determine a data manager coupled to a buffer for a buffer transaction based on the identification of the buffer; and
  distribute the buffer transaction to the determined data manager for execution.

4. The system according to claim 3, wherein the starting address further includes an offset in the buffer, and the data manager is further configured to execute the buffer transaction by:
  determining an initial data unit to start the buffer transaction based on the offset; and
  accessing the number of data units of the buffer coupled to the data manager, the number of data units starting from the initial data unit.

5. The system according to claim 2, wherein the instruction further includes a stride, and the starting address of each buffer transaction in the second set is further offset by the stride.

6. The system according to-claim 1, wherein each data manager is associated with a predetermined number of buffers.

7. The system according to claim 1, wherein the buffer transaction includes at least one of a read transaction, a write transaction, or a broadcast transaction.

8. The system according to claim 7, wherein in response to the buffer transaction including the broadcast transaction, the instruction further includes a data width of data to be broadcasted, and the data width equals a width of accessed data in a data unit.

9. A method for batch accessing a plurality of buffers associated with a processor core array, comprising:
  generating, at a buffer controller, an instruction for performing a plurality of buffer transactions on at least some buffers of the plurality of buffers;
  acquiring, at a data manager associated with a corresponding buffer of the plurality of buffers, the instruction from the buffer controller;
  executing, at the data manager, a request for a buffer transaction at the corresponding buffer according to the instruction;
  sequentially performing a first set of buffer transactions on the respective buffers;
  determining whether a number of the plurality of buffers is less than a number of the buffer transactions to be performed; and
  sequentially performing a second set of buffer transactions on the respective buffers in response to the number of the plurality of buffers being less than the number of the buffer transactions to be performed.

10. The method according to claim 9, wherein each buffer includes a plurality of data units, and the instruction includes a starting address of the buffer, a number of the buffer transactions to be performed, a number of data units accessed in a buffer transaction.

11. The method according to claim 10, wherein the starting address includes an identification of a buffer, in generating the instruction for performing the plurality of buffer transactions on at least some buffers of the plurality of buffers, the method further comprises:
  determine a data manager coupled to a buffer for a buffer transaction based on the identification of the buffer; and
  distribute the buffer transaction to the determined data manager for execution.

12. The method according to claim 11, wherein the starting address further includes an offset in the buffer, and in executing the buffer transaction at the corresponding buffer according to the instruction, the method further comprises:
  determining an initial data unit to start the buffer transaction based on the offset; and
  accessing the number of data units of the buffer coupled to the data manager, the number of data units starting from the initial data unit.

13. The method according to claim 10, wherein the instruction further includes a stride, and the starting address of each buffer transaction in the second set is further offset by the stride.

14. The method according to claim 9, wherein each data manager is associated with a predetermined number of buffers.

15. The method according to claim 9, wherein the buffer transaction includes at least one of a read transaction, a write transaction, or a broadcast transaction.

16. The method according to claim 15, wherein in response to the buffer transaction including broadcast, the instruction further includes a data width of data to be broadcast, and the data width equals a width of accessed data in a data unit.

* * * * *